United States Patent
Brandner et al.

(10) Patent No.: US 6,533,288 B1
(45) Date of Patent: Mar. 18, 2003

(54) FLANGE SEAL ASSEMBLY

(75) Inventors: Brian W. Brandner, Kingsville (CA);
Keith D. Kersey, Windsor (CA);
Harald Knueppel, Belle River (CA);
Christopher K. Quick, Windsor (CA);
Jeffery L. Yager, Windsor (CA)

(73) Assignee: Walbro Corporation, Cass City, MI (US)

( * ) Notice: Subject to any disclaimer, the term of this patent is extended or adjusted under 35 U.S.C. 154(b) by 190 days.

(21) Appl. No.: 09/595,733

(22) Filed: Jun. 16, 2000

(51) Int. Cl.$^7$ ................................ F16J 15/02
(52) U.S. Cl. ............... 277/630; 277/637; 277/644; 220/304; 220/378; 292/256.6; 292/307 R
(58) Field of Search ................... 277/630, 637, 277/644; 220/297, 298, 304, 378; 292/256.6, 256.63, 263, 307 R

(56) References Cited

U.S. PATENT DOCUMENTS

| | | | |
|---|---|---|---|
| 4,998,639 A | 3/1991 | Seizert et al. ............. 220/85 |
| 5,102,172 A | 4/1992 | Seizeret et al. .......... 292/256.6 |
| 5,207,463 A | 5/1993 | Seizert et al. ............ 292/256.6 |
| 5,330,068 A * | 7/1994 | Duhaime et al. ............ 220/304 |
| 5,660,206 A * | 8/1997 | Neal et al. ............. 137/512.15 |
| 6,012,904 A | 1/2000 | Tuckey ........................ 417/203 |
| 6,357,617 B1 * | 3/2002 | Kido ............................ 220/562 |
| 6,357,618 B1 * | 3/2002 | Kloess et al. ................ 220/319 |
| 6,386,244 B2 * | 5/2002 | Brown et al. ................... 141/1 |
| 2002/0011490 A1 * | 1/2002 | Nakamura et al. ......... 220/4.12 |

* cited by examiner

Primary Examiner—Suzanne Dino Barrett
Assistant Examiner—Christopher Boswell
(74) Attorney, Agent, or Firm—Reising, Ethington, Barnes, Kisselle, Learman & McCulloch, P.C.

(57) ABSTRACT

A flange seal assembly for a multi-layered plastic fuel tank having a wall with a permeation barrier layer encapsulated by inner and outer layers. The wall is blow molded about a ring so that the outer layer alone is in actual contact with the ring. The permeation barrier layer is exposed and engaged by a resilient seal. A locking member is located outboard of a flange which engages the seal. Engagement of the locking member with the ring produces a force compressing the seal against the flange and the permeation barrier layer.

22 Claims, 4 Drawing Sheets

FLANGE SEAL ASSEMBLY

FIELD OF THE INVENTION

This invention relates generally to a flange seal assembly and more particularly to a flange seal assembly utilized with multi-layered plastic fuel tanks.

BACKGROUND OF THE INVENTION

Environmental concerns and regulations have spurred the need to reduce the amount of hydrocarbon fuel vapors emitted by vehicles and have led to the development of new technologies for manufacturing plastic fuel tanks. A fuel tank constructed from a single layer of a plastic, such as high-density polyethylene, has been found to have an unacceptably high permeation rate of fuel vapor emission. Therefore, current plastic fuel tanks are formed with multiple layers, one of which is a fuel vapor permeation barrier layer.

Flange connections required to mate with holes in the fuel tank are typically secured to the pre-molded tank by welding. Resilient seals, applied within the flange, typically contact the outer layer of the tank and do not seal directly to the permeation barrier layer. Consequently, permeation and vapor emission occurs about the flange area of the fuel tank.

SUMMARY OF THE INVENTION

A flange seal assembly seals against vapor permeation through fuel tank wall portions which surround an opening through a multi-layered plastic fuel tank. The plastic fuel tank has a permeation barrier layer preferably encapsulated by a outer layer and a inner layer. The permeation barrier layer is required to prevent the permeation and subsequent release of hydrocarbon and alcohol fuel vapors from the fuel tank. To further prevent the release of fuel vapor, the permeation barrier layer is preferably in contact with a permeation resistant seal located within the flange seal assembly. The flange seal assembly further comprises a ring and preferably a locking member, both of which envelop the hole in the fuel tank wall.

The fuel tank wall is blow molded about the ring. The ring preferably has a sleeve rigidly secured to a radial shelf encapsulated by the outer layer and preferably provides vertical support for a channel which receives the seal. The shelf extends radially inward from the sleeve and the sleeve extends axially upward from the shelf. The sleeve preferably has a plurality of tabs releasably engaging the locking member and a plurality of datum members used during blow molding and circumferentially around the channel. The tabs and the datum members extend intermittently around the hole, outward of the channel, and are exposed above the outer layer of the fuel tank wall.

Preferably, the locking member has a plurality of apertures each of which receives a tab of the sleeve and upon rotation engages a slot in each tab to secure them together. When the locking member is engaged within the slots, it applies a normal force exerted down upon a flange to compress the seal. The flange, in turn, exerts a force upon the seal which mates between the flange and the wall and into sealing engagement with them and preferably the permeation barrier layer.

Objects, features and advantages of this invention include a seal assembly which prevents fuel vapor loss from permeation, liquid fuel loss from seal leakage, is of relatively simple design, economical to manufacture and assemble, and has a long useful service life.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENTS

Figure 1:
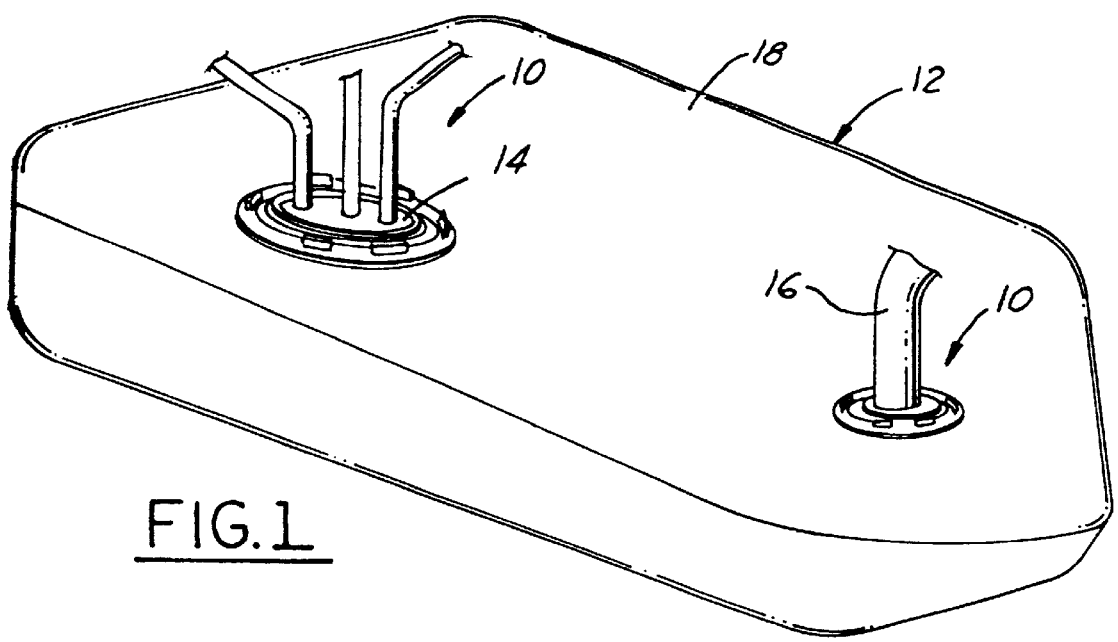
FIG. 1 is a plan view of two flange seal assemblies embodying the invention on a fuel tank.

Referring in more detail to the drawings, FIG. 1 shows two flange seal assemblies 10 each embodying this invention and of different sizes in a fuel tank 12. One assembly secures a fuel pump module or sender unit 14 in the fuel tank 12 and the other secures a fuel tank filler pipe 16 to the fuel tank 12. The fuel tank 12 is commonly used in automotive vehicles and may be constructed of steel or plastic. The flange seal assembly 10 can be utilized with any fuel tank material, but is particularly useful with the multi-layered plastic fuel tank 12.

Figure 2:
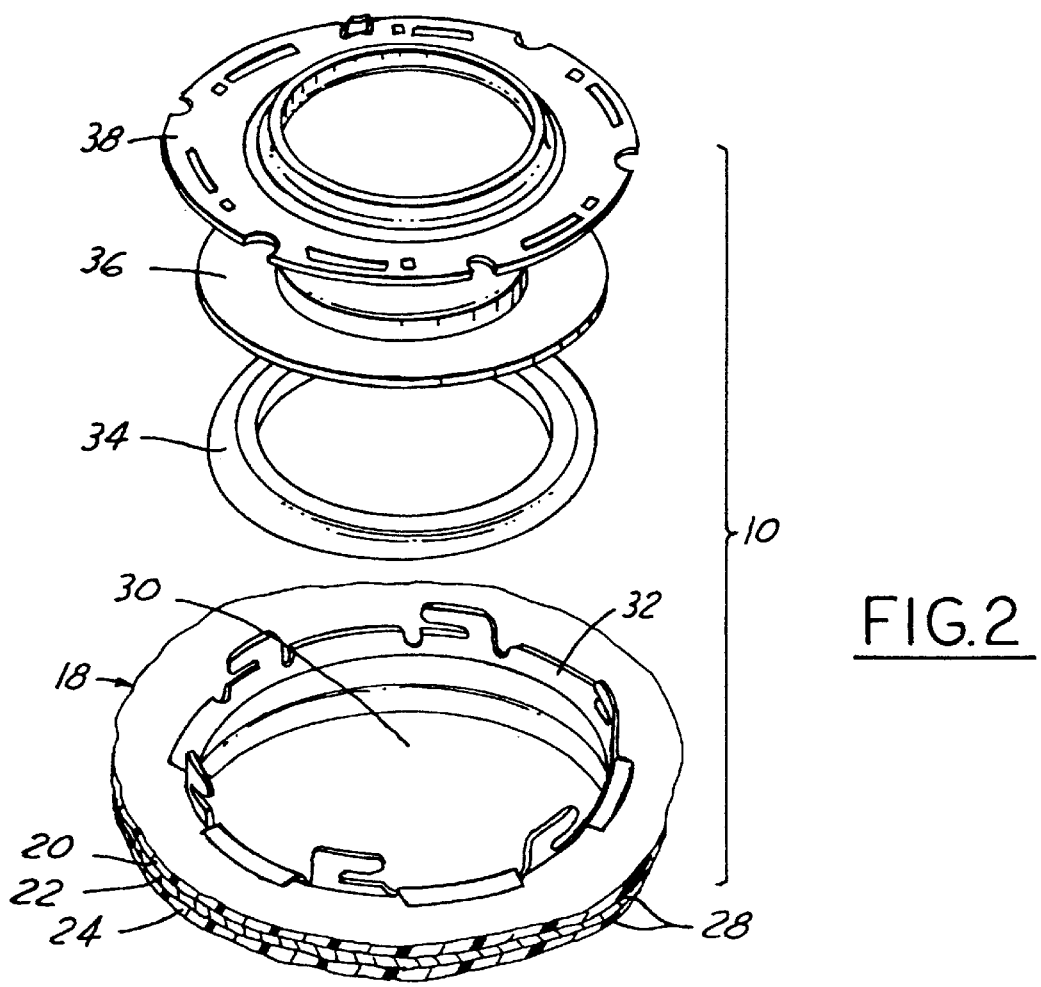
FIG. 2 is an exploded perspective view of the flange seal assembly of FIG. 1.

As shown in FIG. 2, the flange seal assembly 10 is received in a multi-layered wall 18 of the plastic fuel tank 12. The fuel tank wall 18 preferably has an outer layer 20, a permeation barrier layer 22, and a inner layer 24. The wall may include other sub-layers. Two adhesive layers 28 are utilized to secure the permeation barrier layer 22 to the outer and inner layers, 20, 24. Other than a hole 30, the permeation barrier layer 22 is completely encapsulated by the outer and inner layers 20, 24. A portion of the barrier layer 22 is exposed adjacent to and extends continuously around the perimeter of the hole 30.

The outer and inner layers 20, 24 are usually made of high-density polyethylene (HDPE). The permeation barrier layer 22 is commonly made of ethylene vinyl alcohol copolymer. However, barrier layer 22 may be made of any material which would substantially reduce the amount of hydro-carbon vapors that would diffuse, permeate or otherwise escape through the HDPE fuel tank wall 18.

Flange seal assembly 10 has a ring 32, a seal 34, a flange 36 and a locking member 38. The ring 32 is embedded in the outer layer 20 of fuel tank wall 18 and circumscribes the hole 30. The seal 34 also circumscribes the hole 30 and in assembly is between and is in resilient contact with the flange 36 and the outer layer 20. In assembly, the locking member 38 is above and bears on the flange 36 and is in slidable engagement with the ring 32. The engagement of locking member 38 with ring 32 applies a force compressing the resilient seal 34 into firm sealing engagement with the flange 36 and the tank wall 18.

Figure 3:
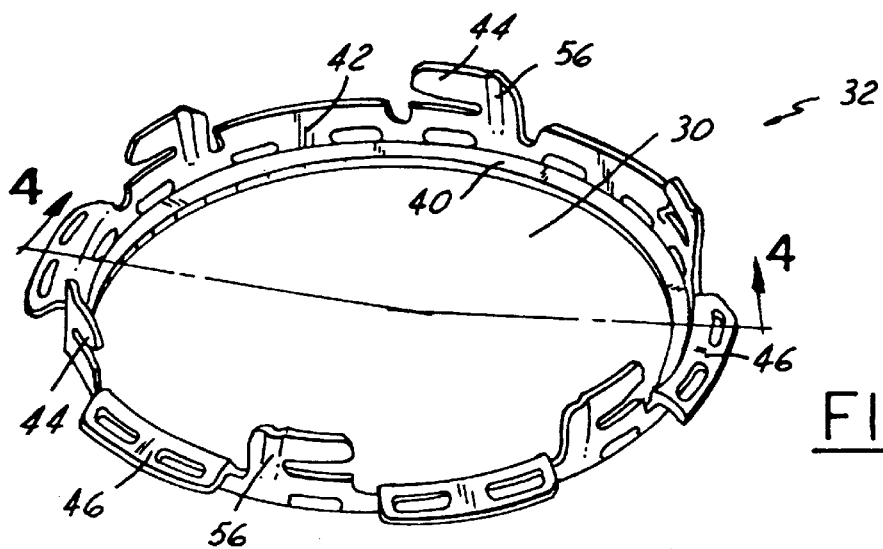
FIG. 3 is a perspective view of a ring.

As shown in FIG. 3, the ring 32 has a radial shelf 40 rigidly connected to a sleeve 42. Shelf 40 generally extends radially inwardly from sleeve 42 and is generally perpendicular thereto. Sleeve 42 generally extends axially and upwardly from shelf 40 and has a plurality of alternating tabs 44 and datum members 46. The plurality of tabs 44 are generally intermittent, perpendicular to, and extend generally axially above the plurality of datum members 46. The datum members 46 extend substantially radially outward from the tabs 44.

Figure 4:
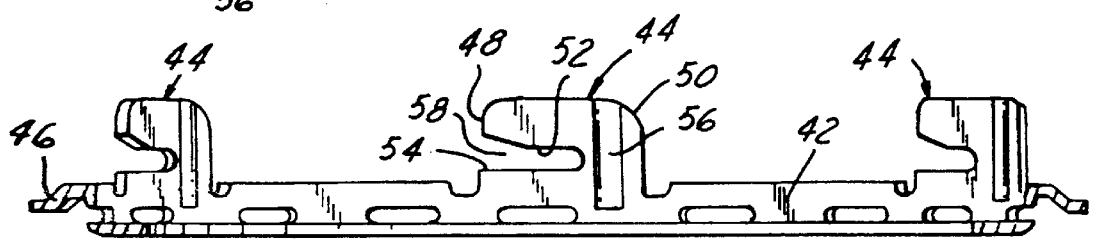
FIG. 4 is a cross-sectional view of the ring taken along line 4—4 of FIG. 3.
Figure 5:
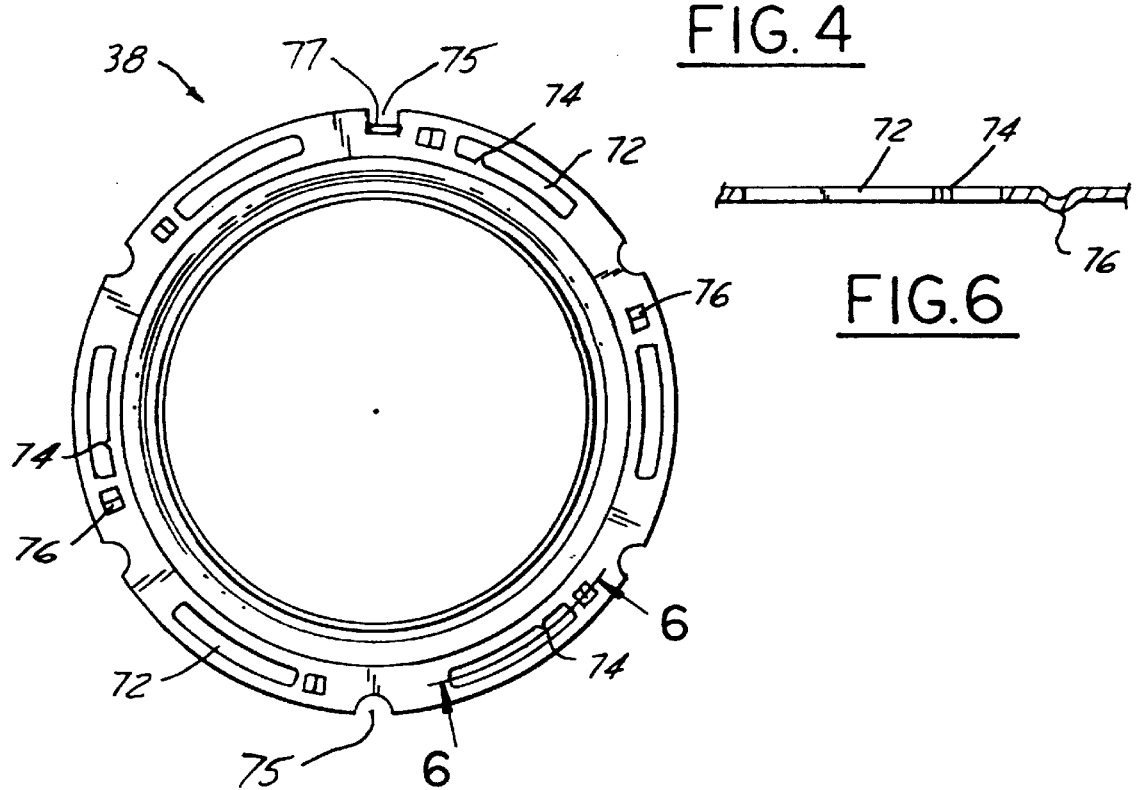
FIG. 5 is a outer view of the locking member.
Figure 6:
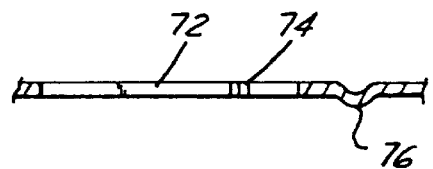
FIG. 6 is a partial cross-sectional view of the locking member taken along line 6—6 of FIG. 5.
Figure 7:
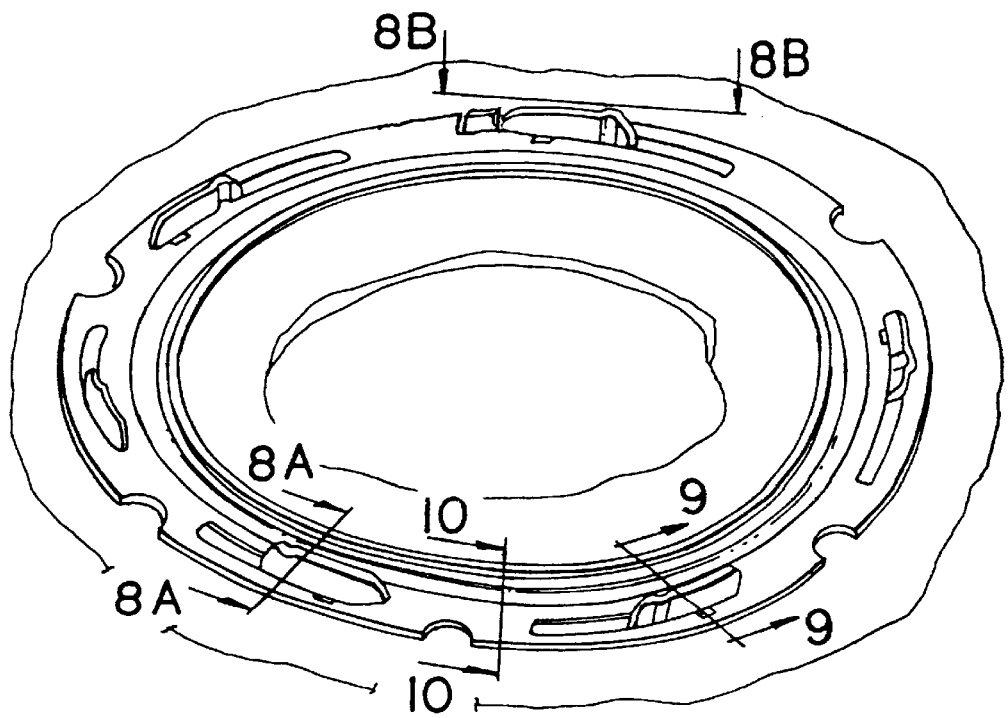
FIG. 7 is a perspective view of the flange seal assembly.

As shown in FIG. 4, for interlocking with ring member 32, each tab 44 has a circumferentially extending elongated slot 58 extending from a leading edge 48 of the tab 44 toward its trailing edge 50 and terminating short of the trailing edge. As shown in FIGS. 5 and 6, the locking member 32 has a plurality of circumferentially spaced apertures 72 and in assembly the tabs 44 of the ring 32 project through the aperture 72 and a portion of the locking member is received in the slot 58 of the tab between its upper and lower edges 52 and 54. As shown in FIG. 8B, ring 32 and member 38 are retained in this interlocked position by a tang 74 in each aperture 72 projecting radially outward into a complementary axially extending groove 56 in each tab 44 which is preferably stamped or engraved therein. Although each tab 44 preferably has the groove 56, not every aperture 72 necessarily contains the tang 74. The number of tangs 74 is established by that needed to engage securely the locking member 38 to the ring 32.

In order to tighten the locking member 38 onto the ring 32, the locking member 32 has a plurality of notches 75 located along the perimeter for receipt of a wrench-like device (not shown). To positively stop the tightening action, at least one vertical member 77 is attached rigidly and generally extends upwardly from the locking member 38. Vertical member 77 contacts the leading edge 48 of tab 44 when groove 56 is in receipt of tang 74, thereby stopping the tightening action. For ease of manufacturing, the vertical member 77 is preferably integral to the locking member 38 and is extruded from the notch 75. Preferably, not every notch 75 has an extruded vertical member 77 since only one vertical member is actually required.

The cut-outs created to form the notches 75 during the manufacturing process, other than the notch containing the vertical member 77, are preferably removed and disposed of for weight savings. Preferably, the number of notches 75 located on locking member 38 are in excess to the number required for engagement by the wrench-like device. Therefore, it is not necessary that the wrench-like device fits into the notch 75 having the vertical member 77.

Figure 8A:
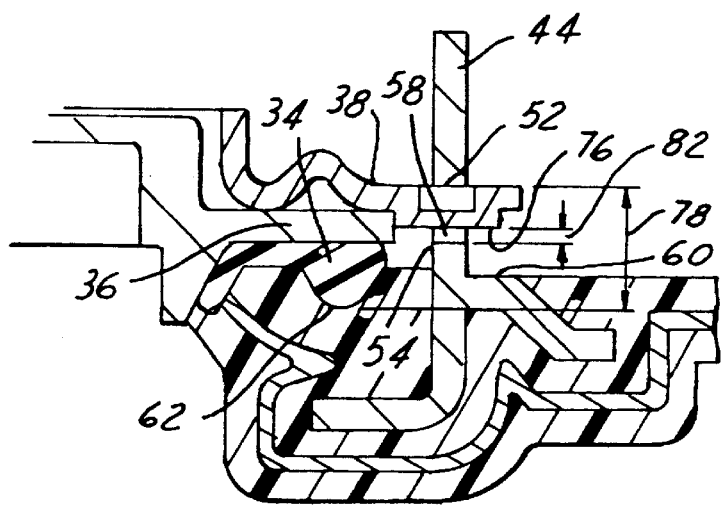
FIG. 8A is a partial cross-sectional view of the flange seal assembly taken along line 8A—8A of FIG. 7.
Figure 8B:
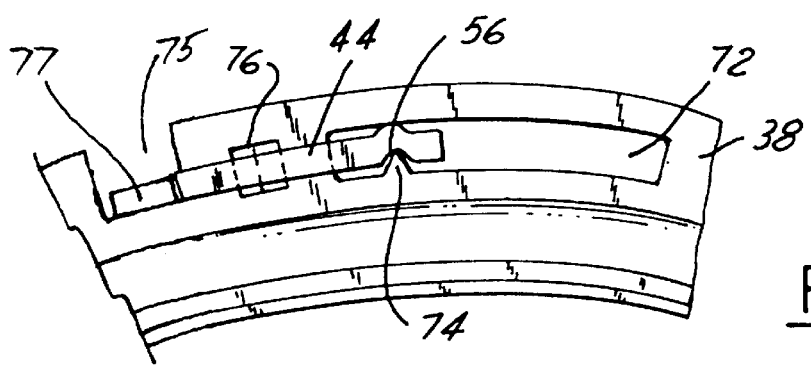
FIG. 8B is an enlarged fragmentary outer view of the flange seal assembly taken along line 8B—8B of FIG. 7.
Figure 9:
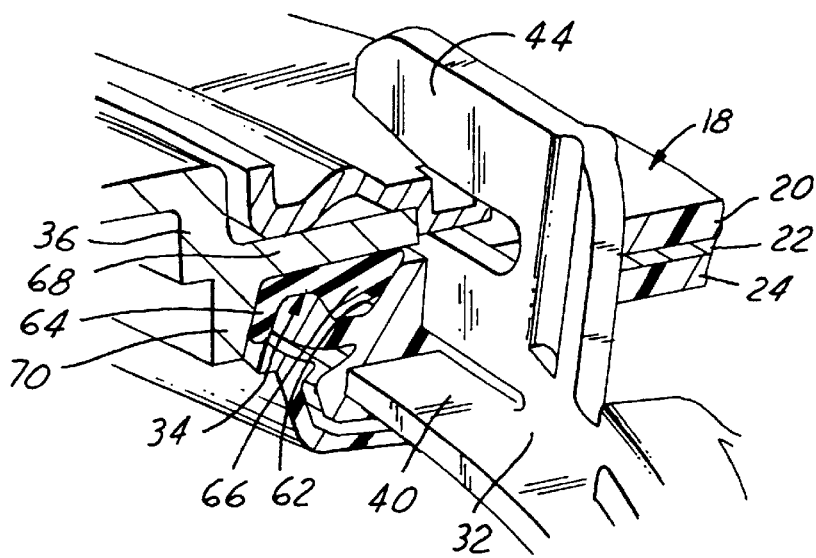
FIG. 9 is a partial cross-sectional view of the flange seal assembly taken along line 9—9 of FIG. 7.

As shown in FIGS. 8A and 9, when interlocked in assembly, the locking member 38 bears on the upper edge 52 of each slot 58 and the underlying flange 36 to apply a force to compress the resilient seal 34 between the flange and the wall 18 of the fuel tank 12 to provide a seal between them.

Preferably, to ensure a proper seal even if the assembly 10 becomes axially distorted, such as from an automobile accident or a substantial pressure differential between the interior and exterior of the tank, as shown in FIG. 8A, preferably the locking member 38 has a plurality of circumferentially spaced projections or prominences 76 which in assembly overlie or are spaced a predetermined distance 82 from the lower edge 54 of a slot 58 of a tab 44 of the ring in which it is received. The predetermined distance 82 is less than the maximum axial distance to which the resilient seal 34 could be compressed without permanent deformation. Therefore, the flange seal assembly 10 will tolerate some axial distortion, bending or flexing during use, and if extremely distorted (1.5 mm), then some of the projections 76 will bear on the lower edge 54 of their associated slots 58 without compromising the performance of the seal assembly 10. Because locking member 38 is not engaged directly and tightly to both the upper and lower edge 52, 54 of each slot 58, and some play is created by distance 82, the manufacturing tolerances may be somewhat greater for ring 32.

Figure 10:
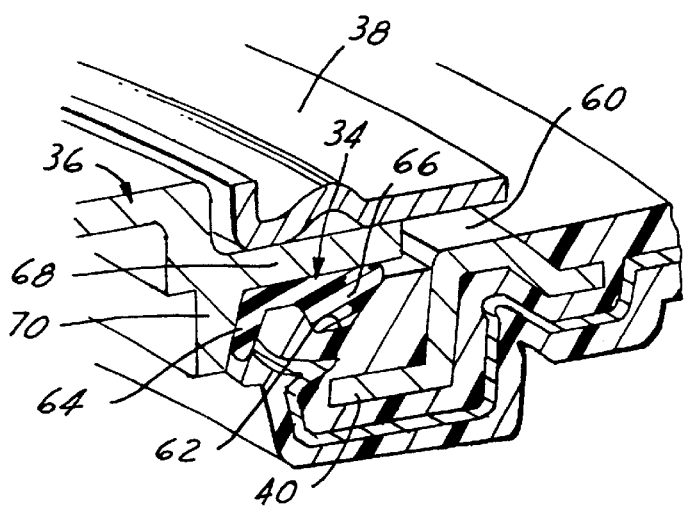
FIG. 10 is a partial cross-sectional view of the flange seal assembly taken along line 10—10 of FIG. 7.

As shown in FIGS. 9 and 10, the seal 34 has a lip 64 and an integral bulb 66. The bulb 66 is seated resiliently within the channel 62 and the lip 64 extends radially inward from bulb 66 and is seated resiliently against the exposed permeation barrier layer 22. As such, the surface of the wall 18 defining the hole 30 is preferably slightly inwardly tapered downward to assist in both a slight axial and a substantial radial compression of the lip 64 of seal 34.

Under normal conditions, bulb 66 of seal 34 is exposed to an axially consistent and circumferentially uniform compression defined by the axial distance 78 between the upper edge 52 of the slot 58 of each tab and the channel 62 in the tank wall 18. During the blow molding process, the outer surface 60 of each one of the plurality of datum members 46 is in contact with the mold. This contact creates a point of reference, or datum, which assures the axial distance 78 remains constant about the circumference of the hole 30 in the tank 12.

As shown in FIGS. 9 and 10, the ring 32 is preferably attached to the wall 18 during the initial blow molding process of making the fuel tank 12. As a result of the blow molding process, the outer layer 20 of wall 18 completes the encapsulation of radial shelf 40. In addition, sleeve 42 is substantially surrounded, but not encapsulated, by the outer layer 20. The tabs 44 penetrate and extend above the outer layer 20. The datum members 46 each have an outer surface 60 which is substantially flush with the portion of the outer layer 20 adjacent the outer periphery of the ring 32. The channel 62 is also formed in the outer layer 20 during the blow molding process. The channel 62 surrounds the hole 30 radially inward of the tabs 44, faces upward, and is located generally above the radial shelf 40. The depth of channel 62 remains constant and is measured in reference to the outer surface 60 of the plurality of datum members 46 since the outer surface 60 is in contact with a surface of the mold cavity (not shown) during the blow molding process. The shelf 40 serves to provide vertical support for wall 18 near the channel 62 so that the wall 18 may withstand the force of the compressed seal 34.

Because ring 32 must maintain its form during the blow molding process, the melting point of the ring 32 is substantially higher than the melting point of the fuel tank wall 18, and because ring 32 must provide structural rigidity to the flange seal assembly 10, it is preferably made of steel.

Prior to, and even after the blow molding process, the permeation barrier layer 22 is completely encapsulated between the outer layer 20 and the inner layer 24. Since the fuel tank wall 18 is blow molded outward and toward ring 32, only the outer layer 20 of wall 18 makes contact with the ring 32, and the permeation barrier layer 22 does not make contact with ring 32 or channel 62, but is separated from both by outer layer 20. Therefore, the permeation barrier layer 22 is not broken by ring 32 so the vapor barrier characteristics are not compromised. The permeation barrier layer 22 extends radially inward beneath the radial shelf 40 of ring 32, and then upward and back over the radial shelf 40 and then continues to extend radially inward toward the center of the hole 30 and is exposed adjacent to the edge of the hole 30.

After blow molding of the tank 12, the hole 30 is created by cutting or machining-out the excess plastic within the perimeter of the ring 32. Cutting through wall 18 exposes the permeation barrier layer 22 (which would otherwise be encapsulated continuously between the outer and inner layers 20, 24) so that it will be engaged by the lip 64 of the seal 34 when compressed in assembly.

The flange 36 can be an integral part of any of a variety of devices which require a sealable hole 30 into the fuel tank 12 such as the fuel sender unit 14 and the fuel tank filler pipe 16. As shown in FIG. 9, flange 36 has a radial portion 68 and an axial portion 70 both of which in assembly are in sealed engagement with the seal 34. The axial portion 70 extends generally downward from radial portion 68 and is generally radially inward of and perpendicular to the radial portion 68. Axial portion 70 may be tapered inwardly downward to operatively coincide with the previously discussed taper of the wall surface defining the hole 30. When flange 36 is positioned within hole 30, the bulb 66 of seal 34 is in resilient axial engagement with the radial portion 68, and the lip 64 is in resilient, generally radial, engagement with the axial portion 70. Depending upon the degree of the taper of the wall surface defining hole 30, as previously discussed, lip 64 is also in limited axial engagement with permeation barrier layer 22 and axial portion 70.

The same molding process or step which molds and expands the fuel tank wall 18 also secures the ring 32 to the wall and molds the channel 62 within the outer layer 20 of the wall. The same machining process or step which creates the hole 30 also exposes the permeation barrier 22 continuously about the perimeter of the hole. After the bulb 66 portion of the seal 34 is placed in channel 62, thus extending the lip 64 inward and over the exposed permeation barrier layer 22, the flange may then engage the seal from an axial direction. Upon engagement, the axial portion 70 of the flange 36 generally engages the lip 64 prior to the radial portion engaging the bulb 66. The axial portion 70 is slid axially downward against the resilient lip 64 until the radial portion 68 engages bulb 66.

With bulb 66 engaged to the radial portion 70, the apertures 72 of the locking member 38 are radially aligned to the tabs 44 of the ring 32. Once aligned, the locking member 38 engages the flange 36 from an axial direction. The locking member 38 is then rotated toward the leading edges 48 of the tabs 44, whereupon the locking member contacts the upper edges 52 of the slots 58 of the tabs 44 and slides upon the flange 36. Because the upper edge 52 is sloped slightly downward from the leading edge 48, the locking member 38 moves axially downward as it rotates. This in turn forces flange 36 to move downward and further compress bulb 66 of seal 34. Ultimately, the axial compression distance of bulb 66 substantially exceeds the resultant compression distance of lip 64. The rotation of locking member 38 ceases when the tangs 74 snap into the grooves 56 of the tabs 44 and the vertical member 77 contacts the leading edge 48 of tab 44, thereby locking the locking member 38 to ring 32 in a fully seal 34 compressed state.

Second Embodiment

Figure 11:
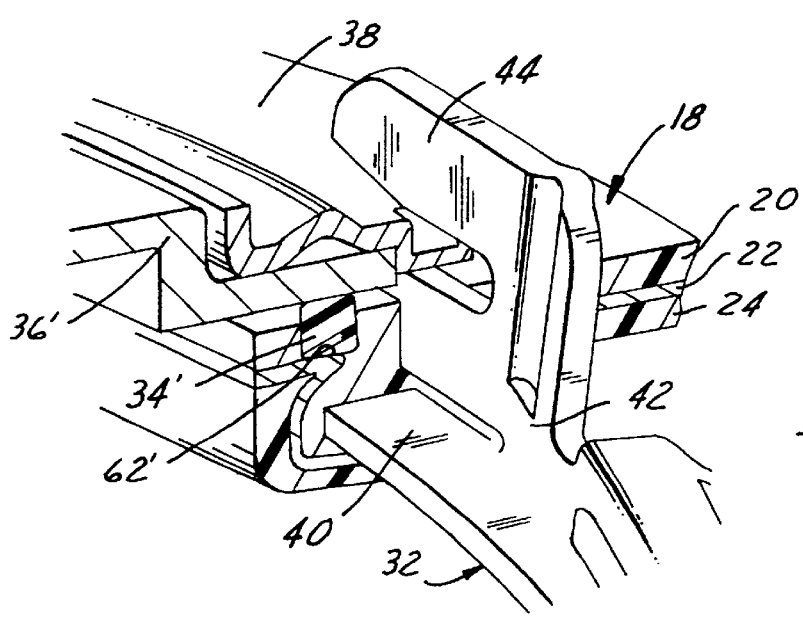
FIG. 11 is a partial cross-sectional view of a second embodiment of the invention, similar to the sectional view of FIG. 9.

FIG. 11 illustrates a second embodiment of a flange seal assembly 10'. The process of blow molding the outer layer 20 to the ring 32 causes the fuel tank wall 18 to envelope the radial shelf 40. The outer layer 20 along with the permeation barrier layer 22 not only extends beneath the radial shelf 40, but also wraps around and extends over the shelf 40 radially inward of the sleeve 42. Due to the nature of the blow molding process, any blow-molded channel 62 would be formed in the outer layer 20 only and would not contact the permeation barrier layer 22. Therefore, a channel 62' is machined into the wall 18 to a depth sufficient to expose the permeation barrier layer 22 so that in assembly it will be in sealed engagement with the seal 34 compressed between the wall 18 and the flange 36'. Although the second embodiment entails an additional machining operation to produce channel 62', the seal 34' and the flange 36' are simplified relative to the arrangement of the first embodiment. The simplified seal 34' does not require the lip 64 of seal 34 to engage the exposed permeation barrier layer 22. The simplified flange 36' does not require the axial portion 70 of flange 36 to sealingly engage the exposed permeation barrier layer 22.

We claim:

1. A flange seal assembly comprising:
   a wall having an outer layer, a permeation barrier layer and a hole through the wall, the outer layer being disposed exteriorly of the permeation barrier layer,
   a ring in engagement with the outer layer, encircling the hole and having a radially extending shelf encapsulated by the outer layer, spaced from the permeation barrier layer and the permeation barrier layer extending radially inward beyond the radial shelf;
   a portion of the barrier layer being exposed adjacent to and extending continuously around the perimeter of the hole;
   a resilient seal in direct engagement with the permeation barrier layer and positioned to encompass the hole; and
   a flange portion in engagement with the resilient seal.

2. The flange seal assembly of claim 1 further comprising a locking member in slidable contact with the flange portion and engageable contact with the ring.

3. A flange seal assembly comprising:
   a wall having an outer layer, a permeation barrier layer and a hole through the wall, the outer layer being disposed exteriorly of the permeation barrier layer;
   a ring in engagement with the outer layer and encircling the hole;
   a portion of the barrier layer being exposed adjacent to and extending continuously around the perimeter of the hole;
   a resilient seal in direct engagement with the permeation barrier layer and positioned to encompass the hole;
   a flange portion in engagement with the resilient seal;
   a locking member in slidable contact with the flange portion and engageable contact with the ring; and
   the ring having a radial shelf encapsulated by the outer layer, the radial shelf being spaced from the permeation barrier layer, the permeation barrier layer being constructed and arranged to extend radially inward beyond the radial shelf.

4. The flange seal assembly of claim 3 wherein the ring further has a sleeve connected rigidly to the radial shelf, the sleeve disposed radially outward from and perpendicular to the radial shelf, the sleeve being exposed above the outer layer.

5. The flange seal assembly of claim 4 further comprising:
   the seal having a lip and a bulb positioned radially about the hole, the lip disposed radially inward of the bulb; and the outer layer having a blow molded channel, the bulb positioned within the channel, the bulb in resilient engagement with the flange, and the channel is disposed above the shelf.

6. The flange seal assembly of claim 5 wherein the flange has a radial portion and an axial portion, the radial portion being connected rigidly with and disposed substantially perpendicular to the axial portion, the bulb being in resilient engagement with the radial portion, the lip being in resilient engagement with the axial portion and the permeation barrier layer, wherein the hole is tapered inwardly downward, the axial portion of the flange is tapered inwardly downward, the tapered axial portion opposing and operatively facing the tapered hole.

7. The flange seal assembly of claim 6 further comprising:
the ring having a plurality of tabs, each tab having a slot with an upper edge and a lower edge, the slots extended circumferentially about the hole; and
the locking member having a plurality of apertures, the plurality of tabs extended axially through the plurality of apertures, the slots being constructed to receive the locking member upon rotation, with the upper edge engaged with the locking member upon rotation.

8. The flange seal assembly of claim 7 wherein the locking member has a plurality of prominences rigidly attached to and extending downward from the locking member, the plurality of prominences disposed above the lower edge within the slot upon engagement of the locking member with the upper edge, the plurality of prominences disposed at a predefined distance from the lower edge, the predefined distance being less than the maximum axial compression distance of the seal.

9. The flange seal assembly of claim 7 further comprising:
the locking member having a plurality of tangs, each tang extending radially outward and into one of the plurality of apertures; and
the plurality of tabs each having a leading edge, a trailing edge, and a groove, the leading and trailing edges extending axially, each one of the plurality of slots in communication with the leading edge, the groove disposed substantially near the trailing edge, the groove extended axially and opposed to the hole, each tang snapped resiliently into each groove upon rotation of the locking member.

10. The flange seal assembly of claim 9 wherein the locking member has a plurality of notches and at least one vertical member, the plurality of notches located along the perimeter, the at least one vertical member integral to the locking member and extended upwardly, each one of the at least one vertical member extruded from one of the plurality of notches, the vertical member in contact with the leading edge of the tab when the groove is in receipt of the tang.

11. The flange seal assembly according to claim 10 wherein the ring further comprises a plurality of datum members, each datum member disposed between two tabs of the plurality of tabs, the plurality of datum members extending radially outward and embedded within the outer layer of the wall, each datum member having a top surface, the top surface exposed through and positioned flush with the outer layer, the top surface establishing a consistent depth of the channel with respect to the ring.

12. The flange seal assembly according to claim 7 wherein the outer layer composition contains high density polyethylene, the permeation barrier layer is attached to the outer layer by an adhesive layer, the permeation barrier layer being ethylene vinyl alcohol copolymer, and the ring and the locking member being metal.

13. The flange seal assembly according to claim 11 wherein the flange is a portion of a fuel sender unit.

14. The flange seal assembly according to claim 11 wherein the flange is an end portion of a fuel tank filler pipe.

15. A flange seal assembly for an automotive fuel tank comprising:
a wall having a hole;
a ring having a shelf and a sleeve, the sleeve connected rigidly and disposed above the shelf, the shelf extended radially inward from and substantially perpendicular to the sleeve, the ring secured rigidly to the wall, the sleeve being exposed above the wall and the shelf being encapsulated by the wall;
a resilient seal positioned above the shelf and radially inward from the sleeve;
a flange in engagement with the seal; and
a locking member slidably engaged with the flange and engaged with the sleeve.

16. A flange seal assembly for an automotive fuel tank comprising:
a wall having a hole;
a ring having a shelf and a sleeve, the sleeve connected rigidly and disposed above the shelf, the shelf extended radially inward from and substantially perpendicular to the sleeve, the ring secured rigidly to the wall, the sleeve being exposed above the wall;
a resilient seal positioned above the shelf and radially inward from the sleeve;
a flange in engagement with the seal;
a locking member slidably engaged with the flange and engaged with the sleeve;
the sleeve having a plurality of tabs positioned about the hole and outboard of the wall, each tab having a leading edge, a trailing edge, an upper edge and a lower edge, the upper and lower edges defining a slot, the slot in communication with the leading edge, the slot extended radially, the leading edge extended axially; and
the locking member having a plurality of apertures and a plurality of prominences, each one of the plurality of tabs extending axially through one of the plurality of apertures, the slots adapted to receive the locking member upon rotation, the upper edge engaging the locking member upon rotation, the plurality of prominences attached rigidly to and extending downward from the locking member, the radial position of the flange defined by the plurality of prominences, each of the prominences disposed outboard of the lower edge of each one of the slots upon engagement of the locking member with the upper edges, the plurality of prominences disposed at a predefined distance from the lower edge.

17. The flange seal assembly of claim 16 further comprising:
the locking member having a plurality of tangs, each tang extending radially outward and into one of the plurality of apertures; and
the plurality of tabs each having a groove, the groove disposed substantially near the trailing edge, the groove extended axially and opposed to the hole, each tang snapping into each groove upon rotation of the locking member.

18. The flange seal assembly of claim 17 wherein the locking member has a plurality of notches and at least one vertical member, the plurality of notches located along the perimeter, the at least one vertical member integral to the locking member and extended upwardly, each one of the at least one vertical member extruded from one of the plurality of notches, the vertical member in contact with the leading edge of the tab when the groove is in receipt of the tang.

19. The flange seal assembly according to claim 18 further comprising:

the wall having a channel, the wall encapsulating the shelf, the channel located outboard of the shelf and about the hole, the seal in resilient engagement with the channel; and the ring having a plurality of datum members, each datum member disposed between two tabs of the plurality of tabs, the datum members extending radially outward and embedded within the wall, each of the datum members having a top surface, the top surface being exposed through and positioned flush with the adjacent portion of the wall, and the top surface establishing a consistent depth of the channel with respect to the ring.

20. The flange seal assembly according to claim 19 wherein the wall has an outer layer, a permeation barrier layer, and an inner layer, the outer layer disposed over the permeation barrier layer, the permeation barrier layer being encapsulated by the outer and inner layers, the wall being blow molded about the ring with the outer layer disposed between the ring and the permeation barrier layer, the permeation barrier layer extended radially inward and beneath the radial shelf.

21. The flange seal assembly according to claim 20 further comprising:

a channel blow molded into the outer layer of the wall, the channel positioned circumferentially about the hole, disposed radially inward of the sleeve and over the radial shelf;

the seal having a lip and a bulb, the bulb positioned resiliently within the channel, the lip secured radially inward to the bulb, the permeation barrier layer in communication with the hole, the lip in resilient engagement with the permeation barrier layer; and the flange having a radial portion and an axial portion, the radial portion connected rigidly and disposed generally perpendicular to the axial portion, the bulb being in engagement with the radial portion, and the lip in engagement with the axial portion.

22. The flange seal assembly according to claim 20 wherein a channel is machined into the outer layer of the wall, the channel positioned circumferentially about the hole, the channel being disposed radially inward of the sleeve and over the radial shelf, the permeation barrier extending axially upward from beneath the shelf then radially outward over the radial shelf, the machined channel being constructed and arranged to expose the permeation barrier layer, the seal disposed in the channel and the seal being in resilient engagement with the exposed permeation barrier layer and the flange.

* * * * *